US008276147B2

(12) United States Patent
Messmer et al.

(10) Patent No.: US 8,276,147 B2
(45) Date of Patent: Sep. 25, 2012

(54) LOW SYNCHRONIZATION MEANS OF SCHEDULER FINALIZATION

(75) Inventors: William Robert Messmer, Woodinville, WA (US); Paul F. Ringseth, Bellevue, WA (US); Genevieve Fernandes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 12/580,500

(22) Filed: Oct. 16, 2009

(65) Prior Publication Data

US 2011/0093851 A1    Apr. 21, 2011

(51) Int. Cl.
*G06F 9/46* (2006.01)
(52) U.S. Cl. ............. 718/102; 718/1; 718/713; 713/300
(58) Field of Classification Search .................. None
See application file for complete search history.

(56) References Cited

U.S. PATENT DOCUMENTS

| 5,692,193 | A | 11/1997 | Jagannathan |
| 7,263,700 | B1 | 8/2007 | Bacon |
| 7,356,817 | B1 | 4/2008 | Cota-Robles |
| 2004/0221285 | A1* | 11/2004 | Donovan et al. .................. 718/1 |
| 2005/0108711 | A1 | 5/2005 | Arnold |
| 2005/0198088 | A1 | 9/2005 | Subramoney |
| 2007/0011681 | A1* | 1/2007 | Shu et al. ...................... 718/102 |
| 2009/0006506 | A1 | 1/2009 | DiFlora |
| 2009/0019442 | A1* | 1/2009 | Liu ............................... 718/102 |
| 2009/0077361 | A1 | 3/2009 | Neiger |
| 2009/0077550 | A1* | 3/2009 | Rhine .............................. 718/1 |

OTHER PUBLICATIONS

Resource Management in Concurrency Runtime—Part 2—Published Date: Jul. 21, 2009 http://blogs.msdn.com/nativeconcurrency/.
Concurrency Runtime—Retrieved Date: Sep. 29, 2009 http://msdn.microsoft.com/en-us/library/dd504870(VS.100).aspx.

\* cited by examiner

*Primary Examiner* — Emerson Puente
*Assistant Examiner* — Dong Kim
(74) *Attorney, Agent, or Firm* — Workman Nydegger

(57) ABSTRACT

Shutting down a computer work scheduler. The work scheduler includes a number of virtual processors, each of which is either active or inactive. An active processor executes work, searches for work, or is idle. An inactive has no context running atop it. The method includes determining that all processors controlled by the scheduler are idle. As a result of determining that all controlled by the scheduler are idle, the method proceeds to a first phase of a shutdown operation, which when successful, includes: performing a sweep of all collections searching for any work in the scheduler and determining that no work is found in the scheduler. As a result of determining that no work is found in the scheduler, the method proceeds to a second phase of a shutdown operation, which when successful includes messaging all contexts in the scheduler and telling them to exit.

20 Claims, 4 Drawing Sheets

US 8,276,147 B2

LOW SYNCHRONIZATION MEANS OF SCHEDULER FINALIZATION

BACKGROUND

Background and Relevant Art

Computers and computing systems have affected nearly every aspect of modern living. Computers are generally involved in work, recreation, healthcare, transportation, entertainment, household management, etc.

Modern computing systems often include multiple processor, multiple core and/or multiple thread architectures. This allows the systems to simultaneously perform different tasks among the different processors. Thus, different portions of a computing operation can be performed by different threads within the same system.

Work schedulers can be used to assign work to different threads. Work schedulers can implement a number of different virtual processors and can assign work to the different virtual processors to facilitate the work being accomplished. Work is defined as some computing task.

Some work schedulers, such as the ConcRT scheduler available from Microsoft Corporation of Redmond Wash., have semantics such that once they are released by the user, they shut down and finalize after all work queued to the schedulers is completed. Unfortunately, counting work within the scheduler may be prohibitively expensive due to the significant cache line contention it would generate. Illustratively, assignment of each work task would need to include an operation to increment a counter implemented on a shared cache line. To increment the counter, the cache line would need to be locked out by the thread incrementing the counter from other threads. In software transactional system, other threads that needed to increment the counter, would be stuck waiting for the lock to be released before they could increment the counter and begin the work. In hardware based transactional systems, concurrent attempts to access the cache line may result in large numbers transaction failures and cache line invalidations.

Because many different threads within the scheduler add and remove work from a variety of different collections, a hierarchical count of work suffers the same type of problems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One illustrative embodiment includes a method that may be practiced in a computing system. The method includes acts for shutting down a computer work scheduler. The work scheduler includes a number of virtual processors, each representing the ability to execute a single thread. Each virtual processor is either active or inactive. An active processor has a context running atop it performing at least one of executing work, searching for work, or being idle after not finding work after a predetermined amount of searching for work. An inactive processor has no context running atop it.

The method includes determining that all processors in a given set of active virtual processors controlled by the scheduler are idle. As a result of determining that all processors in the given set of active virtual processors controlled by the scheduler are idle, the method proceeds to a first phase of a shutdown operation, which when successful, includes: performing a sweep of all collections searching for any work in the scheduler and determining that no work is found in the scheduler. As a result of determining that no work is found in the scheduler, the method proceeds to a second phase of a shutdown operation, which when successful includes messaging all contexts in the scheduler and telling them to exit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein include functionality for shutting down a work scheduler. Embodiments include functionality whereby a scheduler effectively watches for each virtual processor in the scheduler which is performing work or searching for work to become idle. A virtual processor becoming idle is an indication that it cannot find work. Once all virtual processors have become idle, the changing of processor state to active, either from idle or inactive, of virtual processors is gated such that the shutting down can be aborted and rolled back if needed. The scheduler ensures that no more work exists in any scheduler collection. If such can be verified, while all active processors are idle, finalization of the shutdown begins. Otherwise, shutdown is rolled back until the next time that all virtual processors become idle.

Some embodiments include functionality for using idle detection on a collection of a completely independent set of virtual processors as a means of detecting when to start finalization. Embodiments may include multiple phase shutdown with rollback, where the rollback is either due to finding work or virtual processors being resurrected from idle or inactive states to perform new work in the scheduler. Resurrection implies that work was found. As used herein resurrection happens when a reference count (which will be described in more detail below) of the scheduler falls to zero, thus starting the attempt to finalize, and then some context unblocks and starts up. That context increments the reference count of the scheduler to pass it to another thread. Some embodiments may include a virtual processor gate mechanism and transition semaphore, with state bits in a machine word to guarantee atomic transitions. Some embodiments may use a sweep mechanism after idle detection to determine whether to proceed with finalization.

Figure 1:
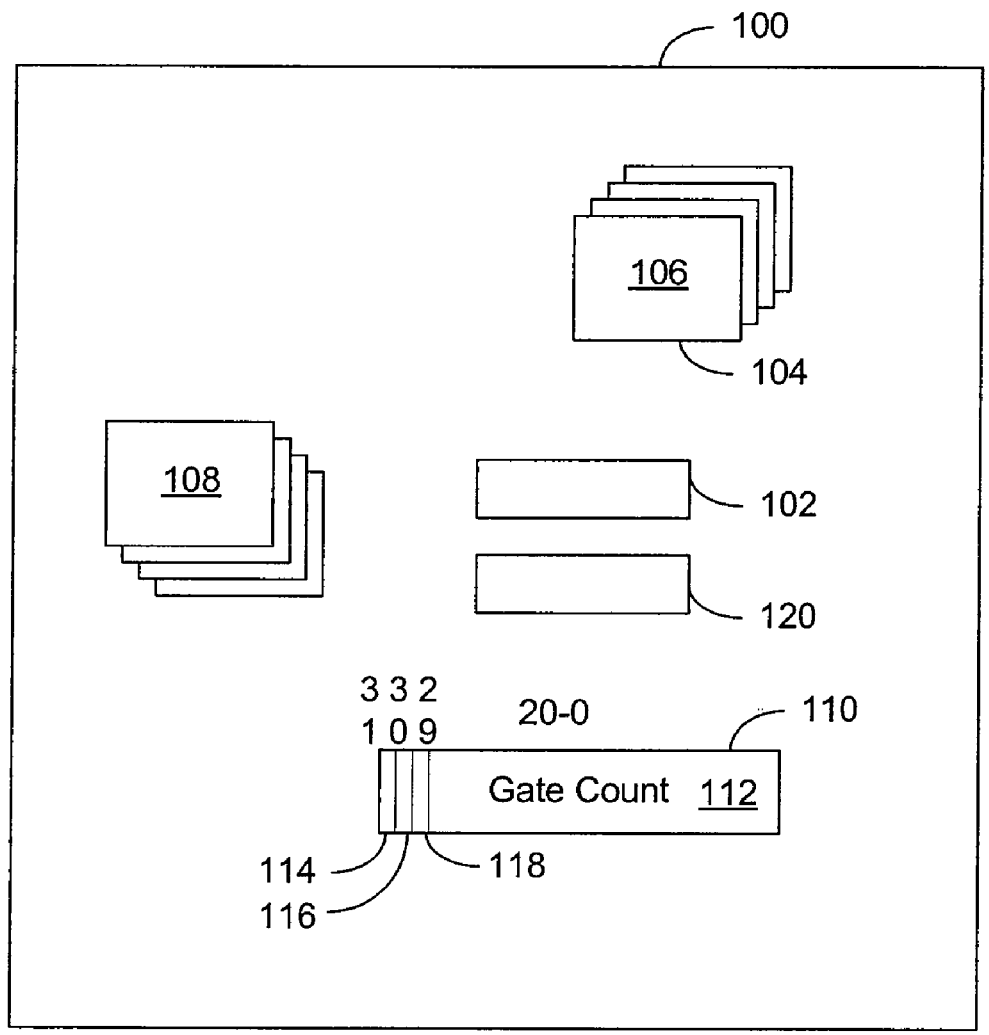
FIG. 1 illustrates a work scheduler.

Illustrative embodiments will now be illustrated. Referring now to FIG. 1, a scheduler 100 is illustrated. The scheduler 100 is a reference counted object that an external client can manipulate, such as for example, through standard Reference/Release application programming interfaces (APIs). The scheduler 100 includes a reference count 102. The reference count, in this example, stores a count defining a number of external clients that have called and are presently using the scheduler 100. In the illustrated embodiment, when the reference count 102 of the scheduler falls to zero, the scheduler begins a shutdown process, that when successful, finishes executing all the work assigned to it, shuts itself down (sometimes this process is referred to herein as finalization), and optionally notifies the users/clients that have called the scheduler. In some embodiments, notification can occur as a result of the user requesting to be notified.

The scheduler 100 itself contains a number of virtual processors referred to herein genetically as 104. Each virtual processor 104 represents the ability to execute a single thread. A virtual processor executing a thread may be described as having a context running atop it. Virtual processors 104 can be either active or inactive. Active virtual processors have a context 106 running atop them which is either executing work, searching for work, or idle. A virtual processor 104 may transition to an idle state if the virtual processor 104 cannot find work to execute after repeated searching. Inactive virtual processors are virtual processors which have yet to become active in that they have no context running atop them.

Figure 2:
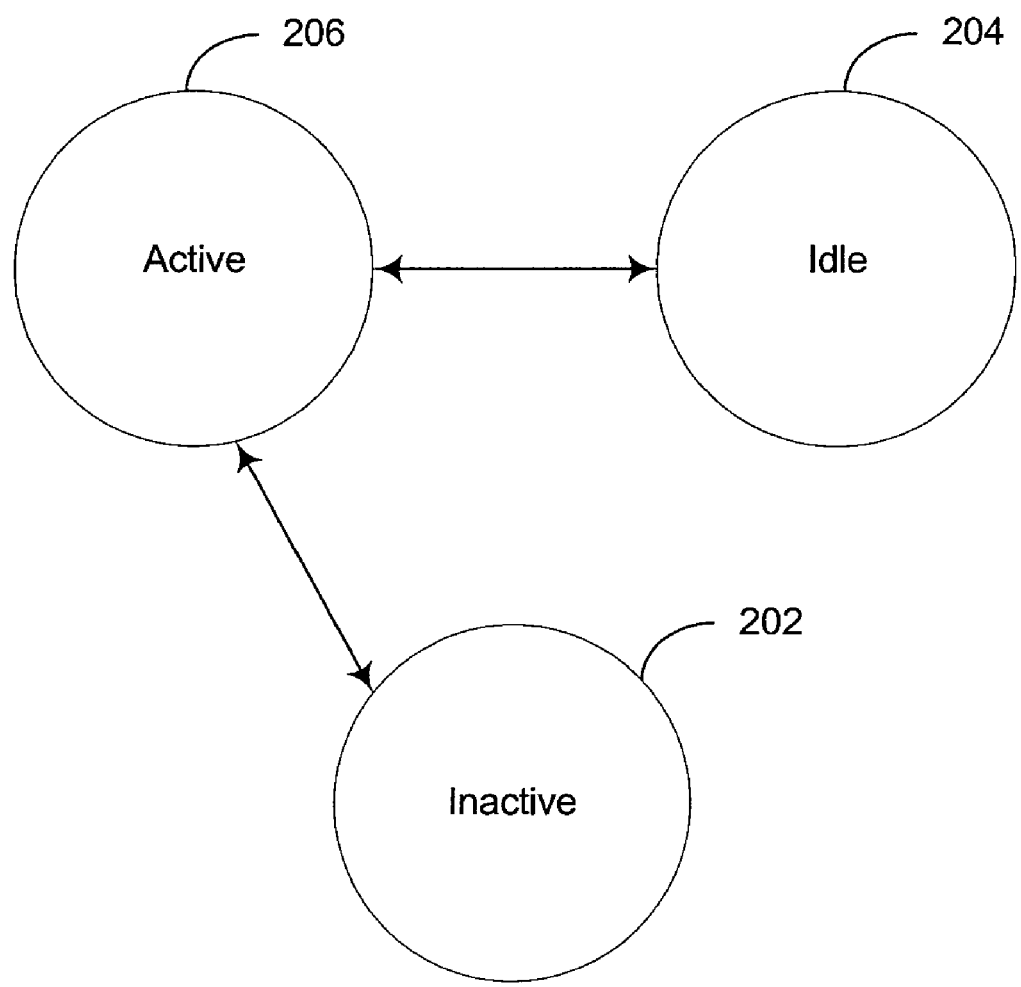
FIG. 2 illustrates a state transition diagram.

Referring now to FIG. 2, a state diagram is shown illustrating transitions of virtual processors. For convenience, FIG. 2 illustrates virtual processors in one of three states. The three states include an inactive state 202, an active but idle state 204, and an active and non-idle state 206. As noted previously, a virtual processor in the inactive state 202 is a virtual processor with no context running atop it. A processor in an active but idle state 204 is a processor that is not actively performing work or searching for work, but is nonetheless running a context atop it and is available for work. A processor in an active and non-idle state 206 is a processor that has a context running atop it and is actively either performing work or searching for work.

When a given context executing atop a virtual processor finishes executing its assigned work item, it begins a process referred to as search for work. It may go through all collections 108 in the scheduler in specific order and try to find a new work item to execute. A collection 108 may be a member of collections (e.g., queues) of runnable contexts or realized chores. A collection 108 may also or alternatively be collections (e.g., work stealing queues) of tasks which may be stolen to load balance parallel work. If a virtual processor 104 cannot find such a work item, the virtual processor 104 puts itself into, or is put into by an external agent, a state 204 referred to as idle. In particular, the virtual processor 104 it is put to sleep until new work arrives in the scheduler 100, at which time the virtual processor 104 is awoken and is no longer idle, but is in the active a non-idle state 106. Conceptually, when the reference count 102 of the scheduler hits zero and all active virtual processors 104 have become idle, the scheduler 100 attempts to proceed into a first phase of shutdown.

To coordinate detection of idle, activation/removal of virtual processors via a dynamic resource manager, and awakening of idle virtual processors via work (e.g.: recently unblocked contexts), the scheduler's internal state maintains a shutdown gate 110. In the embodiment illustrated, the shutdown gate 110 is a single machine word. The lower bits of the machine word (29 in this case) are the gate count 112. In this particular embodiment, this is the number of active virtual processors minus the number of idle virtual processors. The topmost 3 bits of the machine word shutdown gate 110 are flags which are changed atomically with respect to the lower 29 bits.

When the scheduler reference count 102 falls to zero—indicating that the client wants the scheduler to shutdown—the scheduler will atomically set a shutdown initiated flag 114 with a CAS (atomic compare-and-swap) loop. The CAS loop atomically compares the value of the machine word shutdown gate 110 at the beginning and end of the CAS loop, and if the compare is equal, then the shutdown initiated flag 114 is set. If the gate count 112 is zero at the time the CAS succeeds, this indicates that there are no active virtual processors that are not idle. This means that no virtual processor within the scheduler was able to find work in any collection. However, there may be work which will be scheduled at a later time (e.g.: blocked contexts that may be unblocked from another thread). These instances will be discussed later herein. Once the shutdown initiated flag 114 is set while the gate count indicates that there are no active virtual processors that are not idle, the scheduler proceeds to phase one shutdown.

At the start of phase one shutdown, the scheduler executes a CAS loop to set the active suspend state flag 116. This flag 116 is only set if the gate count 112 is zero. If the CAS fails because the gate count 112 has changed, shutdown is aborted and will be reattempted the next time the gate count 112 reaches zero. If the CAS succeeds, a computing system including the scheduler prevents virtual processors from performing a state transition (e.g. from idle 204 to active 206 or from inactive 202 to active 206) until the flag 116 is cleared. During this time, the scheduler performs a sweep of all collections 108 and searches for any work in the scheduler 100 (including work items that are not runnable such as those assigned to blocked contexts). If any work is found, the scheduler clears the suspend state flag 116, wakes any virtual processor blocked on a state transition, and rolls back shutdown. If no work is found, the scheduler 100 proceeds to phase two of shutdown.

During phase two of shutdown, the scheduler 100 messages all contexts 106 and tells them to exit. It then utilizes a CAS loop to atomically set the shutdown completed flag 118 and clear the active suspend state flag 116

Once the CAS loop succeeds, the resultant gate count indicates how many virtual processors to awaken via that level of change to a transition semaphore. It then decrements a reference count 120. In the embodiment illustrated, the internal reference count 120 is the number of contexts within the scheduler plus one. The plus one is for the thread which is calling the final release which may not be one of the scheduler's own contexts. When this reference count 120 falls to zero, the scheduler finalizes and signals the client of this. In other embodiments, other instrumentalities may be used. In particular, the reference count 120, or other instrumentality, is used to tell when the scheduler is completely finalized and the memory associated with it can be released (e.g.: the C++ objects destroyed, etc). Additionally, it may be an indication that the client can be notified State transitions of virtual processors, as illustrated in FIG. 2, may follow a careful set of rules to synchronize with this process at key points. In particular, as noted, no synchronization is performed except during state transitions between active 206 to and from inactive 202, and between active 206 to and from idle 204.

When a virtual processor 104 wants to go from the inactive state 202 to active state 206, the virtual processor 104 first checks the shutdown completed flag 118. If set, the activation fails. If not set, the virtual processor 104 waits until the suspend state flag 116 in the gate is clear and then performs a CAS operation on the shutdown gate 110 machine word to increment the gate count while ensuring that no agent simultaneously manipulates the active suspend state flag 116. Waiting may be accomplished, in one embodiment, by the virtual processor 104 spin polling. The CAS operation is retried until it either succeeds or the shutdown completed flag 114 is set.

When a virtual processor 104 wants to go from active 206 to idle 204, for example as the result of not finding work, or active 206 to inactive 202, for example as the result of wanting to retire a virtual processor from dynamic resource management, the virtual processor 104 atomically decrements the shutdown gate 110 machine word, effectively decrementing the gate count in the illustrated embodiment. If the result of the decrement shows the gate count 112 to be zero and the shutdown initiated flag 114 is set, the scheduler tries to CAS-set the active suspend state flag 116. If the CAS succeeds with the gate count 112 remaining zero, phase one of shutdown occurs as described above.

When a virtual processor wants to go from an idle state 204 to an active state 206, it atomically increments the shutdown gate 110 machine word (effectively incrementing the gate count 112). If the result of the increment shows the active suspend state flag 116 as zero, the state transition is allowed. If the result shows the active suspend state flag 116 as non-zero, the state transition blocks on the transition semaphore.

If the scheduler decides to roll back shutdown due to work being found in phase one shutdown, etc, it atomically clears the active suspend state flag 116 via a CAS loop. Once the CAS-loop succeeds, the resultant gate count 112 is examined and the transition semaphore is released that number of times to wake any blocked virtual processors so they may complete state changes.

The scheduler 100 may also fully roll back finalization by clearing the shutdown initiated flag 114. This may happen if, for instance, a blocked context which existed when the scheduler 100 started phase one shutdown unblocked, passed a pointer to the scheduler to a new thread which then took a reference count, incrementing the reference count 102 from zero to one and would fully roll back shutdown.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 3:
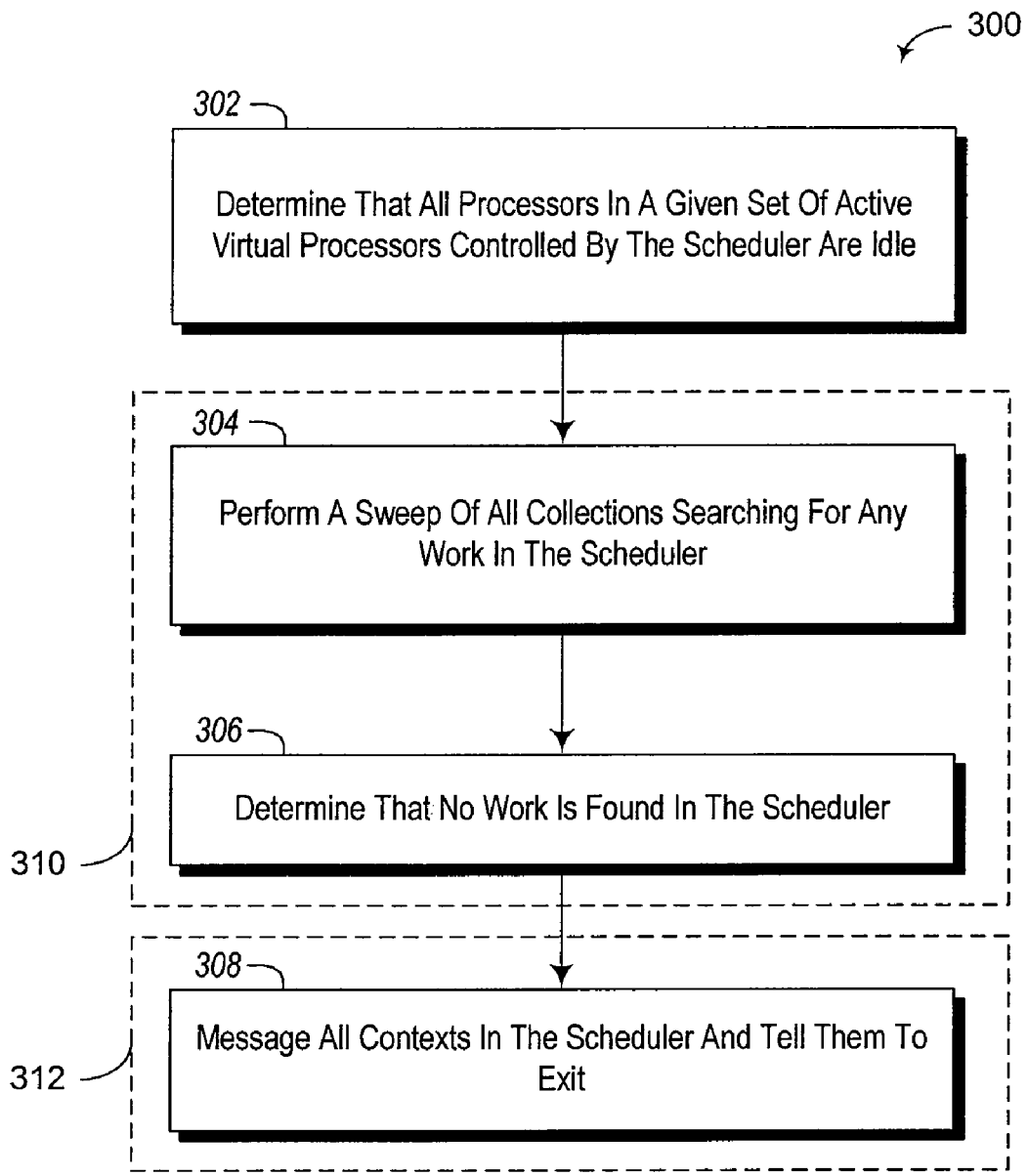
FIG. 3 illustrates a method of shutting down a scheduler.

Referring now to FIG. 3, a method 300 is illustrated. The method 300 includes acts for shutting down a computer work scheduler. The work scheduler includes a number of virtual processors (e.g. virtual processors 104 illustrated in FIG. 1). Each virtual processor represents the ability to execute a single thread (e.g. the contexts 106 illustrated in FIG. 1). Each virtual processor is either active in that it has a context running atop it performing at least one of executing work, searching for work, or idle after not finding work after a predetermined amount of searching for work, or inactive in that it has no context running atop it. The method includes determining that all processors in a given set of active virtual processors controlled by the scheduler are idle (act 302). In one embodiment, as illustrated above, this may be accomplished by using a data structure, such as the gate count 112 illustrated in FIG. 1 above.

The method 300 further includes, as a result of determining that all processors in the given set of active virtual processors controlled by the scheduler are idle, proceeding to a first phase 310 of a shutdown operation. The first phase 310, when successful, includes performing a sweep of all collections searching for any work in the scheduler (act 304) and determining that no work is found in the scheduler (act 306). When the first phase is not successful, shutdown may be aborted. The first phase may not be successful as a result of the failure of a CAS operation as described above, and as will be illustrated in examples below.

As a result of determining that no work is found in the scheduler, the method 300 proceeds to a second phase 312 of a shutdown operation, which when successful includes messaging all contexts in the scheduler and telling them to exit (act 308).

The method 300 may be practiced where the method is performed as a result of determining that a scheduler reference count has fallen to zero. The scheduler reference count comprises a counter included in the scheduler. An example of the scheduler reference counter is illustrated at 102 in FIG. 1.

The method 300 may be practiced where the computing system includes a block of memory, such as the shutdown gate 110. The block of memory may be transactional shared memory. For example, in one embodiment, the block of memory includes an atomic machine word. In the example illustrated in FIG. 1, a 32 bit machine word is used.

The block of memory includes a gate count portion (e.g. gate count 112) including at least a portion of the block of memory that includes a count based on the number of active virtual processors minus the number of idle virtual processors. Determining that all processors in the given set of active virtual processors controlled by the scheduler are idle (act 302) may include determining that the gate count portion indicates that all processors in the given set of active virtual processors controlled by the scheduler are idle.

The block of memory may also include a block of memory that can be read atomically, such as transactional memory. The block of memory may further include a shutdown initiated flag (e.g. 114), an active suspend state flag (e.g. 116), and a shutdown completed flag (e.g. 118). Proceeding to a first phase of a shutdown operation may also be performed as a result of successfully setting the shutdown initiated flag 114 using an atomic compare and swap operation on the block of memory, and detecting that the gate count 112 was zero. In the illustrated embodiment, the shutdown initiated flag 114 is always set when reference counter 120 falls to zero. Processing proceeds to the first phase if the gate count was zero at the time shutdown initiated flag 114 was set. Thus, processing only proceeds with the first phase of shutdown if there were zero active virtual processors at the time the shutdown initiated flag 114 is set.

The first phase of the shutdown operation may further include successfully setting the active suspend state flag using an atomic compare and swap operation on the block of memory. This ensures that count of the gate count portion continues to indicate that all processors in the given set of active virtual processors controlled by the scheduler are idle at the conclusion of setting the active suspend state flag. As noted, virtual processors in the work scheduler may be prevented from performing a state transition until the active suspend state flag is cleared.

The second phase of the shutdown operation may further include successfully setting the shutdown completed flag and clearing the active suspend state flag using an atomic compare and swap operation on the block of memory.

In some embodiments, a virtual processor may attempt to transition from an inactive to active state. In these embodiments, the virtual processor checks the shutdown completed flag. When the shutdown completed flag is not set, the virtual processor waits until the active suspend state flag is clear and then performs an atomic compare and swap operation to increment the count of the gate count portion while ensuring that the active suspend state flag is not manipulated.

In some embodiments, when a virtual processor attempts to transition from an active to idle state or active to inactive state, the gate count portion is decremented. In some embodiments, when a virtual processor attempts to transition from an idle to active state, the gate count portion is incremented.

The method 300 may further include signaling a client indicating that the scheduler has been shut down.

Figure 4:
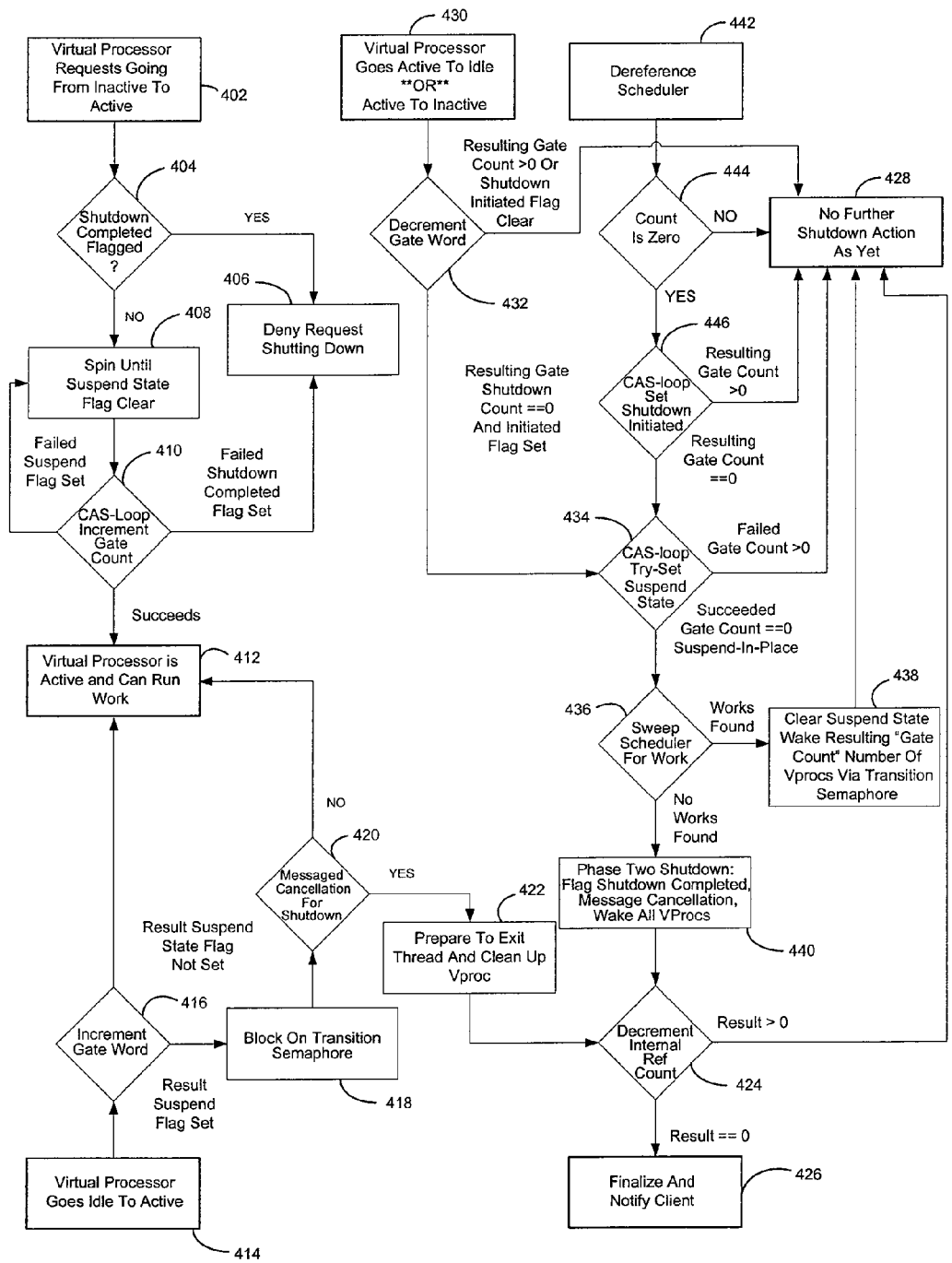
FIG. 4 illustrates various virtual processor management actions.

Referring now to FIG. 4, an overview method figure is shown illustrating method steps for various actions such as virtual processor state transitions and scheduler dereferencing. FIG. 4 will be explained with reference to FIGS. 1 and 2.

Referring now to FIG. 4, at 402 a virtual processor 104 requests going from an inactive state 202 to an active state 206. At 404, a determination is made whether or not the shutdown completed flag 118 is set. If the shutdown completed flag 118 is set, as illustrated at 406, the request to go from an inactive state 202 to an active state 206 is denied inasmuch as the scheduler 100 is shutting down. However, if the shutdown completed flag 118 is not set, then as illustrated at 408 the virtual processor 104 will spin poll until the suspended state flag 116 is cleared. Once the suspended state flag 116 is cleared, an atomic compare and swap loop operation is attempted to increment the gate count 112 as illustrated at 410. The atomic compare and swap loop operation may fail as a result of the suspend flag 116 being set. In this case processing returns to 408 were the virtual processor continues to spin until the active suspend state flag 116 is cleared. The compare and swap loop operation illustrated at 410 may alternatively fail because the shutdown completed flag 118 is set. In this case, processing returns to 406 wherein the request to go from an inactive state 202 to an active state 206 is denied inasmuch as the scheduler 100 is shutting down. The atomic compare and swap loop operation illustrated at 410 may succeed in which case the virtual processor 104 is active and can run work as illustrated at 412.

FIG. 4 further illustrates an action where a virtual processor goes from idle to active as illustrated at 414. When the virtual processor 104 goes from an idle state 204 to an active state 206, the gate word 110 is incremented as illustrated at 416, effectively incrementing the gate count 112. After incrementing the gate word 110, a determination can be made whether are not the active suspend state flag 116 is set. If the active suspend state flag 116 is not set, then processing proceeds to 412 where the virtual processor 104 is active and can run work. If the active suspend state flag 116 is set, processing proceeds to 418 where shutdown is blocked on a transition semaphore. Processing then proceeds to 420, after the semaphore is released, where a determination is made whether or not a message for cancellation of shutdown has been sent. If no such message has been sent, then as illustrated at 412, the virtual processor 104 is active and can run work. If such a cancellation message has been made then the virtual processor 104 will prepare to exit the thread context 106 and clean up the virtual processor 104 as illustrated at 422. At 424 and internal reference counter is decremented. The internal reference counter 120 is count of a number related to the number of threads/contexts in the scheduler 100. Notably, in some embodiments, the count in the reference counter 120 may be the number of threads/contexts in the scheduler plus one for the thread that might be calling Release and finalizing in that thread context. If the internal reference count 120 is equal to zero then shut down is finalized and the client is notified as illustrated at 426. If decrementing the internal reference count 120 does not result in the internal reference count 120 being greater than zero, no further shutdown actions are performed at the present time as illustrated at 428.

Reference is now directed to 430 which illustrates the process of events when a virtual processor 104 goes from an active state 206 to an idle state 204 or from an active state 206 to an inactive state 202. When the virtual processor 104 changes state, the gate word 110 is decremented as illustrated at 432. If the resulting gate count 112 is greater than zero or the shutdown initiated flag 114 is cleared then no further shutdown actions are performed as illustrated at 428. Alternatively, if the gate count 112 is equal to zero and the shutdown initiated flag 114 is set, then processing proceeds to 434 wherein an atomic compare and swap loop is attempted to set the active suspend state flag 116. If the atomic compare and swap loop operation fails due to the gate count 112 being greater than zero, then no further shutdown actions are performed at the present time as illustrated at 428. However, if the atomic compare and swap loop operation setting the suspend state active suspend state flag 116 succeeds, then processing proceeds to 436 wherein operations sweeping the scheduler 100 for work are performed. If work is found during the sweep operation, then the active suspend state flag 116 is cleared, and the gate count 112 is used to wake a number of virtual processors 104 as indicated by the gate count 112 using the transition semaphore as illustrated at 438, whereafter no further shutdown actions are performed at the present time as illustrated at 428. However, if no work is found, phase two shutdown is begun whereafter the shutdown completed flag 118 is set, one or more cancellation messages are sent directing all virtual processors to shut down, and all virtual processors are woken so as to initiate shutdown of the virtual processors 104 as illustrated at 440. Processing proceeds to decrementing the internal reference count 120 and a determination is made of the result of the internal reference count so as to determine whether or not finalization and client notification should occur as illustrated at 426 or not performing any further shutdown actions as illustrated at 428.

FIG. 4 further illustrates operations performed when dereferencing a scheduler as indicated at 442. In particular, the scheduler 100 includes a list of work items to be performed. Dereferencing the scheduler, results in an action of determining whether or not the reference count is zero or not at 444. If the reference count is not zero, then no further shutdown actions are performed as of yet as illustrated at 428. If the reference count is zero, then an atomic compare-and-swap loop operation is performed to set the shutdown initiated flag 114 as illustrated at 446. If the gate count 112 is greater than zero after performing the atomic compare-and-swap loop operation on the shutdown gate 110, then no further shutdown actions are performed at the present time is illustrated at 428. However, if the gate count 112 is equal to zero after the atomic compare-and-swap loop operation setting the shutdown initiated flag 114, then further shut down operations may be attempted as previously discussed at 434, 436, 440, 424, 426, 438, and 428 as illustrated in FIG. 4.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A network is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a NIC), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system, a method of shutting down a computer work scheduler, the work scheduler comprising a number of virtual processors, each representing the ability to execute a single thread, wherein each virtual processor is either active in that it has a context running atop it performing at least one of executing work, searching for work, or idle after not finding work after a predetermined amount of searching for work, or inactive in that it has no context running atop it, the method comprising:

determining that all processors in a given set of active virtual processors controlled by the scheduler are idle;

as a result of determining that all processors in the given set of active virtual processors controlled by the scheduler are idle, proceeding to a first phase of a shutdown operation, which when successful, includes:

performing a sweep of all collections searching for any work in the scheduler; and determining that no work is found in the scheduler; and as a result of determining that no work is found in the scheduler proceeding to a second phase of the shutdown operation, which when successful includes messaging all contexts in the scheduler and telling them to exit the scheduler.

2. The method of claim 1, wherein the method is performed as a result of determining that a scheduler reference count has fallen to zero, wherein the scheduler reference count comprises a context counter included in the scheduler wherein the context counter includes a count related to the number of contexts in the scheduler.

3. The method of claim 1, wherein the computing system comprises a block of memory, wherein the block of memory includes a gate count portion including at least a portion of the block of memory that comprises a count based on the number of active virtual processors minus the number of idle virtual processors, and wherein determining that all processors in the given set of active virtual processors controlled by the scheduler are idle comprises determining that the gate count portion indicates that all processors in the given set of active virtual processors controlled by the scheduler are idle.

4. The method of claim 3, wherein the block of memory comprises a block of memory that can be read atomically, and wherein the block of memory further comprises a shutdown initiated flag, an active suspend state flag, and a shutdown completed flag, wherein:

proceeding to the first phase of the shutdown operation is also performed as a result of successfully setting the shutdown initiated flag using an atomic compare and swap operation on the block of memory and detecting that the gate count portion is zero;

wherein the first phase of the shutdown operation further comprises successfully setting the active suspend state flag using an atomic compare and swap operation on the block of memory, which ensures that count of the gate count portion continues to indicate that all processors in the given set of active virtual processors controlled by the scheduler are idle at the conclusion of setting the active suspend state flag, and wherein virtual processors in the work scheduler are prevented from performing a state transition until the active suspend state flag is cleared; and wherein the second phase of the shutdown operation further comprises successfully setting the shutdown completed flag and clearing the active suspend state flag using the atomic compare and swap operation on the block of memory.

5. The method of claim 4, wherein the block of memory comprises an atomic machine word.

6. The method of claim 4, further comprising a virtual processor attempting to transition from an inactive to active state comprising:

checking the shutdown completed flag, and when the shutdown completed flag is not set, waiting until the active suspend state flag is clear and then performing an atomic compare and swap operation to increment the count of the gate count portion while ensuring that the active suspend state flag is not manipulated.

7. The method of claim 4, further comprising a virtual processor attempting to transition from an active to idle state or active to inactive state comprising decrementing the gate count portion.

8. The method of claim 4, further comprising a virtual processor attempting to transition from an idle to active state comprising incrementing the gate count portion.

9. The method of claim 1, further comprising signaling a client indicating that the scheduler has been shut down.

10. A computing system including functionality for shutting down a computer work scheduler, the work scheduler comprising a number of virtual processors, each representing the ability to execute a single thread, wherein each virtual processor is either active in that it has a context running atop it performing at least one of executing work, searching for work, or idle after not finding work after a predetermined amount of searching for work, or inactive in that it has no context running atop it, the system comprising:

a computer module that determines that virtual processors in a given set of active virtual processors controlled by the scheduler are idle;

a computer module that as a result of determining that all processors in the given set of active virtual processors controlled by the scheduler are idle,:
performs a sweep of all collections searching for any work in the scheduler; and
determines that no work is found in the scheduler; and a computer module that, as a result of determining that no work is found in the scheduler messages all contexts in the scheduler and tells them to exit the scheduler.

11. The computing system of claim 10, wherein:
the computing system further comprises a block of memory, wherein the block of memory:
includes a gate count portion including at least a portion of the block of memory that comprises a count based on the number of active virtual processors minus the number of idle virtual processors;
can be read atomically, and wherein the block of memory further comprises a shutdown initiated flag, an active suspend state flag, and a shutdown completed flag, the computing system further comprises a module that successfully sets the active suspend state flag using an atomic compare and swap operation on the block of memory, which ensures that count of the gate count portion continues to indicate that all processors in the given set of active virtual processors controlled by the scheduler are idle at the conclusion of setting the active suspend state flag, and wherein virtual processors in the work scheduler are prevented from performing a state transition until the active suspend state flag is cleared; and the computing system further comprises a module that successfully sets the shutdown completed flag and clearing the active suspend state flag using the atomic compare and swap operation on the block of memory.

12. The computing system of claim 11, further comprising a computer module that prevents state transitions of virtual processors when the active suspend state flag is set.

13. The computing system of claim 11, further comprising one or more computer modules that:
atomically attempt to set the active suspend state flag;
determine that atomically attempting to set the active suspend state flag has failed because all processors in the given set of active virtual processors controlled by the scheduler are not idle at the conclusion of atomically attempting to set the active suspend state flag; and
as a result of determining that atomically attempting to set the active suspend state flag has failed because all processors in the given set of active virtual processors controlled by the scheduler are not idle at the conclusion of atomically attempting to set the active suspend state flag, abort shutting down the work scheduler.

14. The computing system of claim 11, further comprising one or more computer modules that:
atomically set the active suspend state flag;
perform a sweep of all collections searching for any work in the scheduler; and
find work in the scheduler; and
as a result of finding work in the scheduler, clear the active suspend state flag, waking any virtual processors blocked on a state transition and rolling back shutting down the work scheduler.

15. The computing system of claim 10, further comprising a computer module that is configured to roll back shutdown.

16. In a computing environment, a method of shutting down a computer work scheduler, the work scheduler comprising a number of virtual processors, each representing the ability to execute a single thread, wherein each virtual processor is either active in that it has a context running atop it performing at least one of executing work, searching for work, or idle after not finding work after a predetermined amount of searching for work, or inactive in that it has no context running atop it, the method comprising:

determining that all processors in a given set of active virtual processors controlled by the scheduler are idle;

as a result of determining that all processors in the given set of active virtual processors controlled by the scheduler are idle, atomically setting a shutdown initiated flag;

determining that at the time atomically setting the shutdown initiated flag succeeds that all processors in the given set of active virtual processors controlled by the scheduler are idle;

as a result of determining that at the time atomically setting the shutdown initiated flag succeeds that all processors in the given set of active virtual processors controlled by the scheduler are idle, proceeding to a first phase of a shutdown operation, which when successful, includes:
  atomically setting a active suspend state flag;
  performing a sweep of all collections searching for any work in the scheduler; and
  determining that no work is found in the scheduler;

as a result of determining that no work is found in the scheduler proceeding to a second phase of the shutdown operation, which when successful includes:
  messaging all contexts and telling them to exit the scheduler;
  atomically setting a shutdown completed flag; and
  atomically clearing the active suspend state flag.

17. The method of claim 16, wherein the virtual processors are prevented from performing a state transition after the act of atomically setting an active suspend state flag until the active suspend state flag is cleared.

18. The method of claim 16, wherein determining that a given set of active virtual processors controlled by the scheduler are idle comprises referencing a gate count calculated by subtracting a number of idle virtual processor from a number of active virtual processors.

19. The method of claim 16, further comprising as a result of determining that at the time atomically setting a shutdown initiated flag succeeds that all processors in the given set of active virtual processors controlled by the scheduler are idle, proceeding to a first phase of a shutdown operation, which when unsuccessful includes:
  atomically attempting to set an active suspend state flag;
  determining that atomically attempting to set an active suspend state flag has failed because all processors in the given set of active virtual processors controlled by the scheduler are not idle at the conclusion of atomically attempting to set an active suspend state flag; and
  as a result of determining that atomically attempting to set an active suspend state flag has failed because all processors in the given set of active virtual processors controlled by the scheduler are not idle at the conclusion of atomically attempting to set an active suspend state flag, aborting shutting down the work scheduler.

20. The method of claim 16, further comprising as a result of determining that at the time atomically setting a shutdown initiated flag succeeds that all processors in the given set of active virtual processors controlled by the scheduler are idle, proceeding to a first phase of a shutdown operation, which when rolled back includes:
  atomically setting an active suspend state flag;
  performing a sweep of all collections searching for any work in the scheduler; and
  finding work in the scheduler; and
  as a result of finding work in the scheduler, clearing the active suspend state flag, waking any virtual processors blocked on a state transition and rolling back shutting down the work scheduler.

* * * * *